(12) United States Patent
Umayahara et al.

(10) Patent No.: US 9,034,495 B2
(45) Date of Patent: May 19, 2015

(54) FUEL CELL SYSTEM

(75) Inventors: Kenji Umayahara, Aichi (JP); Michio Yoshida, Aichi (JP); Tadaichi Matsumoto, Okazaki (JP); Motohiko Taniyama, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 806 days.

(21) Appl. No.: 12/440,787

(22) PCT Filed: Jan. 31, 2008

(86) PCT No.: PCT/JP2008/051988
§ 371 (c)(1),
(2), (4) Date: Mar. 11, 2009

(87) PCT Pub. No.: WO2008/099743
PCT Pub. Date: Aug. 21, 2008

(65) Prior Publication Data
US 2010/0055521 A1    Mar. 4, 2010

(30) Foreign Application Priority Data

Feb. 5, 2007 (JP) ................................ 2007-026086
Dec. 25, 2007 (JP) ................................ 2007-333012

(51) Int. Cl.
*H01M 8/04* (2006.01)

(52) U.S. Cl.
CPC ....... *H01M 8/04619* (2013.01); *H01M 8/04858* (2013.01); *H01M 8/04567* (2013.01); *H01M 8/04753* (2013.01); *H01M 8/0488* (2013.01); *Y02E 60/50* (2013.01)

(58) Field of Classification Search
CPC ..................... H01M 8/04567; H01M 8/04858; H01M 8/0488; H01M 8/04619; H01M 8/04753

USPC ................................................... 429/430, 432
See application file for complete search history.

(56) References Cited

U.S. PATENT DOCUMENTS

| 6,342,316 B1 | 1/2002 | Okamoto et al. |
| 2003/0118876 A1* | 6/2003 | Sugiura et al. ................ 429/9 |

(Continued)

FOREIGN PATENT DOCUMENTS

| JP | 60-030062 A | 2/1985 |
| JP | 61-284065 A | 12/1986 |

(Continued)

OTHER PUBLICATIONS

Non-Final Office Action mailed Apr. 16, 2013 in co-pending U.S. Appl. No. 12/743,919.

(Continued)

*Primary Examiner* — Eugenia Wang
(74) *Attorney, Agent, or Firm* — Kenyon & Kenyon LLP

(57) ABSTRACT

A fuel cell system performs control such that when a power requirement for the fuel cell is lower than a predetermined value, a supply of a reaction gas to a fuel cell is stopped to keep an output voltage from the fuel cell equal to a high-potential avoidance voltage that is lower than an open end voltage. The fuel cell system further controls the output voltage from the fuel cell with the high-potential avoidance voltage set to be an upper limit when the power requirement for the fuel cell is equal to or higher than a predetermined value. By setting the upper limit of the output voltage of the fuel cell to be the high-potential avoidance voltage, which is lower than the open end voltage, the catalyst can be inhibited from being degraded by an increase in the output voltage from the fuel cell up to the open end voltage.

4 Claims, 9 Drawing Sheets

(56) References Cited

U.S. PATENT DOCUMENTS

| | | | |
|---|---|---|---|
| 2003/0194586 A1 | 10/2003 | Sugiura et al. | |
| 2006/0029846 A1* | 2/2006 | Konoto et al. | 429/23 |
| 2006/0199049 A1* | 9/2006 | Hu et al. | 429/13 |
| 2007/0207355 A1* | 9/2007 | Yoshida | 429/25 |
| 2007/0207356 A1 | 9/2007 | Miyata et al. | |
| 2008/0096057 A1* | 4/2008 | Bono | 429/9 |
| 2009/0098427 A1* | 4/2009 | Reiser | 429/23 |
| 2010/0248054 A1 | 9/2010 | Umayahara | |

FOREIGN PATENT DOCUMENTS

| | | |
|---|---|---|
| JP | 62-113362 A | 5/1987 |
| JP | 07-142079 A | 6/1995 |
| JP | 07-169488 | 7/1995 |
| JP | 11-026002 A | 1/1999 |
| JP | 2002-199505 A | 7/2002 |
| JP | 2003-197210 A | 7/2003 |
| JP | 2003-229138 A | 8/2003 |
| JP | 2004-014159 A | 1/2004 |
| JP | 2004-172028 A | 6/2004 |
| JP | 2004-173450 A | 6/2004 |
| JP | 2004-227995 A | 8/2004 |
| JP | 2005-026054 A | 1/2005 |
| JP | 2005-100820 A | 4/2005 |
| JP | 2005-158557 A | 6/2005 |
| JP | 2005-251674 A | 9/2005 |
| JP | 2005-346979 A | 12/2005 |
| JP | 2007-109569 A | 4/2007 |
| JP | 2007-115442 A | 5/2007 |
| JP | 2008-218398 A | 9/2008 |
| WO | WO 2006-030969 A1 * | 3/2006 |
| WO | WO 2006112427 A1 * | 10/2006 |
| WO | 2006/120822 A1 | 11/2006 |
| WO | 2007/064317 A1 | 6/2007 |

OTHER PUBLICATIONS

Advisory Action mailed Mar. 12, 2013 in U.S. Appl. No. 12/743,919 (related to present application).

Final Office Action mailed Dec. 7, 2012 in U.S. Appl. No. 12/743,919 (related to present application).

Office Action mailed Jul. 31, 2012 in U.S. Appl. No. 12/743,919 (related to present application).

Advisory Action mailed Oct. 25, 2013 in U.S. Appl. No. 12/743,919.

Notice of Allowance issued on Jan. 17, 2014, in U.S. Appl. No. 12/743,919.

* cited by examiner

FIG.7

EXECUTION CONDITIONS FOR
HIGH-POTENTIAL AVOIDANCE CONTROL

|  | PERMIT | INHIBIT |
|---|---|---|
| BATTERY | $SOC \leqq SOC1$ | $SOC \geqq SOC2$ |
| REGENERATIVE BRAKING | REGENERATIVE BRAKING NOT BEING PERFORMED | REGENERATIVE BRAKING BEING PERFORMED |
| GAS LEAKAGE DETECTION | GAS LEAKAGE DETECTION NOT BEING PERFORMED | GAS LEAKAGE DETECTION BEING PERFORMED |

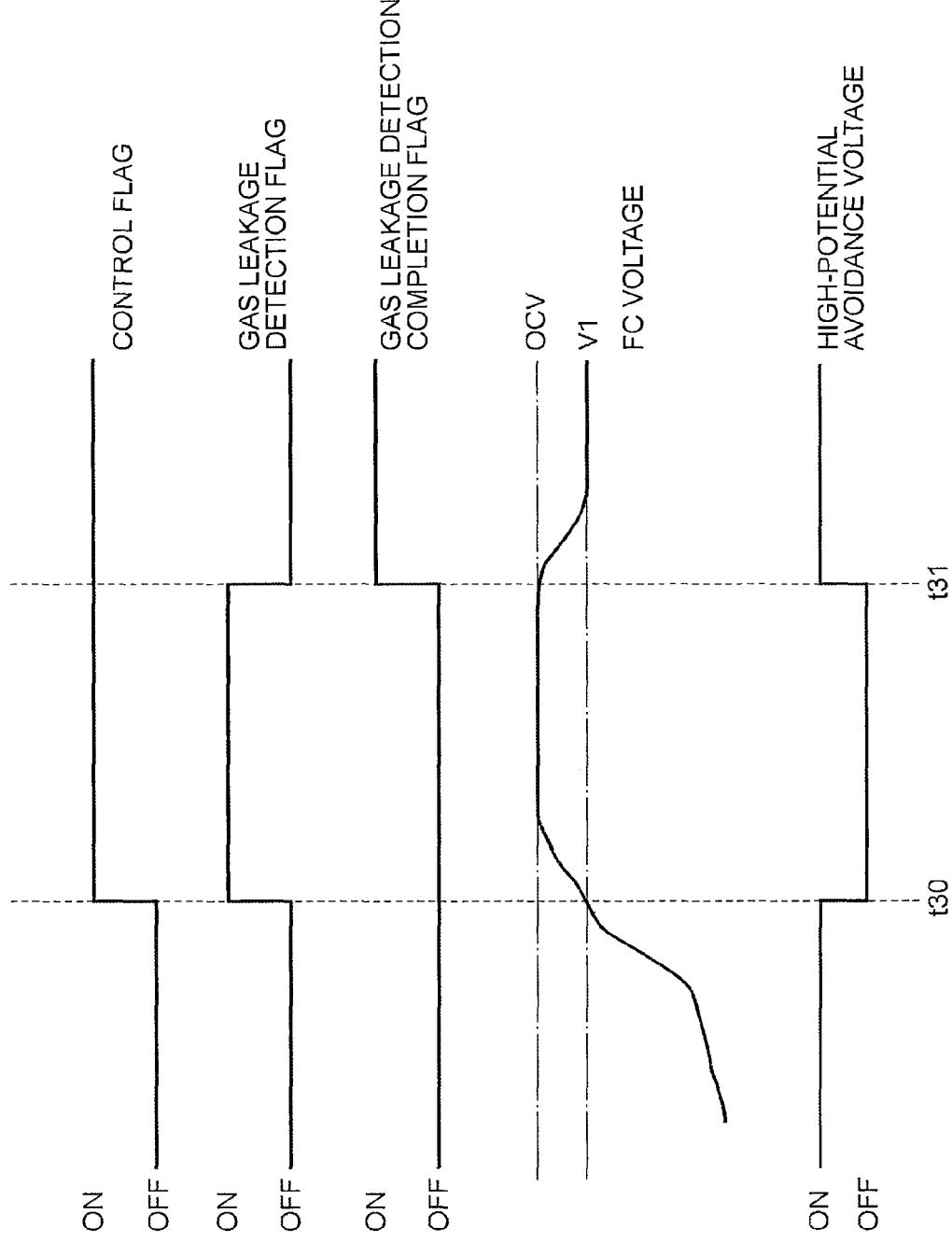

FUEL CELL SYSTEM

This is a 371 national phase application of PCT/JP2008/051988 filed 31 Jan. 2008, which claims priority to Japanese Patent Applications No. 2007-026086 filed 05 Feb. 2007, and No. 2007-333012 filed 25 Dec. 2007, the contents of which are incorporated herein by reference.

TECHNICAL FIELD

The present invention relates to a fuel cell system that controls operation of a fuel cell by setting a high-potential avoidance voltage lower than an open end voltage to be an upper limit for an output voltage from the fuel cell.

BACKGROUND ART

A fuel cell stack is a power generation system which oxidizes a fuel by means of an electrochemical process to emit energy as a result of an oxidation reaction and which converts the resulting energy directly into electric energy. The fuel cell stack includes a membrane-electrode assembly including a polyelectrolyte membrane through which hydrogen ions are selectively transported and paired electrodes made up of a porous material and sandwichingly holding opposite side surfaces of the polyelectrolyte membrane. Each of the paired electrodes is mainly composed of carbon power carrying a platinum-containing metal catalyst and includes a catalyst layer that is in contact with the polyelectrolyte membrane and a gas diffusion layer formed on a surface of the catalyst layer and which is both air permeable and electronically conductive.

A fuel cell vehicle with the fuel cell system mounted therein as a power source controls operation of the fuel cell system such that in a high power region with a high power generation efficiency, the fuel cell stack generates power to allow both the fuel cell stack and a secondary battery or only the fuel cell stack to supply power to a traction motor and such that in a low power region with a low power generation efficiency, the power generation by the fuel cell stack is halted to allow only the secondary battery to supply power to the traction motor. Thus halting the operation of the fuel cell stack in the low load region in which the fuel cell system offers the reduced power generation efficiency is called an intermittent operation. In the low load region in which the fuel cell system offers the reduced power generation efficiency, the intermittent operation is performed to enable the fuel cell stack to operate with the energy conversion efficiency kept high. The efficiency of the whole fuel cell system can thus be increased.

Japanese Patent Laid-Open No. 2004-172028 refers to a fuel cell system that performs the intermittent operation when a load requirement for the fuel cell stack is equal to or lower than a predetermined value. Japanese Patent Laid-Open No. 2004-172028 also refers to a method of preventing a possible delay in a response to a generation request by, when the cell voltage of the fuel cell stack changed into a generation halt state as a result of the intermittent operation is lower than a predetermined value, driving an air compressor to supply an oxygen gas to the fuel cell stack, thus avoiding the possible shortage of oxygen in a cathode of the fuel cell stack to recover the cell voltage.

[Patent Document 1] Japanese Patent Laid-Open No. 2004-172028

BRIEF SUMMARY OF THE INVENTION

The conventional intermittent operation stops the supply of the reaction gas to the fuel cell stack, and sets an instruction voltage for a DC/DC converter connected in parallel with an output terminal of the fuel cell stack, to an open end voltage so as to control the output terminal voltage of the fuel cell stack to the open end voltage (OCV). By keeping the output terminal voltage of the fuel cell stack equal to the open end voltage, the fuel cell stack can be controlled so as to prevent current from flowing out of the fuel cell stack during the intermittent operation.

However, when the output terminal voltage of the fuel cell stack is kept equal to the open end voltage during a low load operation, the platinum catalyst contained in the catalyst layer in the membrane-electrode assembly may be ionized and eluted. Consequently, performance of the fuel cell stack needs to be inhibited from being degraded.

Thus, an object of the present invention is to propose a fuel cell system that can both improve the generation efficiency of the fuel cell and maintain durability of the fuel cell.

To accomplish the object, a fuel cell system according to the present invention comprises a fuel cell which receives a supplied reaction gas to generate power, and a control device which, when a power requirement for the fuel cell is lower than a predetermined value, controllably stops supply of the reaction gas to the fuel cell and keeps an output voltage from the fuel cell equal to a high-potential avoidance voltage which is lower than an open end voltage and when the power requirement for the fuel cell is equal to or higher than the predetermined value, controls the output voltage from the fuel cell with the high-potential avoidance voltage set to be an upper limit.

When the upper limit of the output voltage from the fuel cell is set to be the high-potential avoidance voltage, which is lower than the open end voltage, the catalyst can be inhibited from being degraded by an increase in the output voltage from the fuel cell up to the open end voltage.

The fuel cell system according to the present invention further comprises a DC/DC converter that controls the output voltage from the fuel cell. When the power requirement for the fuel cell is lower than the predetermined value, the control device stops driving of the DC/DC converter when the output voltage from the fuel cell becomes lower than the high-potential avoidance voltage by a predetermined voltage.

The driving of the DC/DC converter is stopped when the output voltage from the fuel cell becomes lower than the high-potential avoidance voltage by the predetermined voltage. Thus, a possible switching loss in the DC/DC converter can be inhibited. Furthermore, a possible increase in the output voltage from the fuel cell can be avoided which is caused by the reaction gas remaining inside the fuel gas.

The fuel cell system according to the present invention further comprises an electric storage device. If power generated by the fuel cell exceeds the sum of power which can be charged by the electric storage device and power which can be consumed by an auxiliary device, the control device permits the output voltage from the fuel cell to increase up to the open end voltage.

If the power generated by the fuel cell exceeds the power which can be charged into the electric storage device, the output voltage from the fuel cell is permitted to increase up to the open end voltage. Thus, possible damage to the electric storage device can be avoided.

The fuel cell system according to the present invention further comprises a traction motor. While the traction motor is performing regenerative braking, the control device permits the output voltage from the fuel cell to increase up to the open end voltage.

While the traction motor is performing the regenerative braking, the output voltage from the fuel cell is permitted to increase up to the open end voltage. Thus, the power generation by the fuel cell is stopped during the regenerative braking to allow more regenerative power to be charged into the electric power device.

The fuel cell system according to the present invention further comprises a plurality of shut-off valves disposed in a pipe line through which the reaction gas is supplied to the fuel cell. The control device closes the plurality of shut-off valves to form a closed space inside the pipe line. While detecting a possible variation in a gas pressure inside the closed space to detect possible gas leakage, the control device permits the output voltage from the fuel cell to increase up to the open end voltage.

While the possible gas leakage is being detected, the output voltage from the fuel cell is permitted to increase up to the open end voltage. Thus, the reaction gas is inhibited from being consumed by the power generation by the fuel cell during the detection of the possible gas leakage. This enables an increase in gas leakage detection accuracy.

Here, the fuel cell is a cell stack comprising a plurality of stacked cells. The control device preferably corrects the high-potential avoidance voltage so that highest one of output voltages from the plurality of cells is equal to or lower than a predetermined value. A variation in cell voltage may make the highest one of output voltages from the plurality of cells higher than the high-potential avoidance voltage per cell. The high-potential avoidance voltage is thus controlled so that highest one of output voltages from the plurality of cells is equal to or lower than the predetermined value (for example, a voltage value obtained by dividing a target voltage for the cell stack by the total number of cells). Consequently, durability can be inhibited from being degraded by the variation in cell voltage.

BRIEF DESCRIPTION OF THE DRAWINGS

FIG. 7 is a diagram showing execution conditions for high-potential avoidance control;

FIG. 10 is a timing chart showing operation control allowing the high-potential avoidance control to be switched on and off depending on whether or not gas leakage detection is performed.

DETAILED DESCRIPTION OF THE INVENTION

An embodiment according to the present invention will be described with reference to the drawings.

Figure 1:
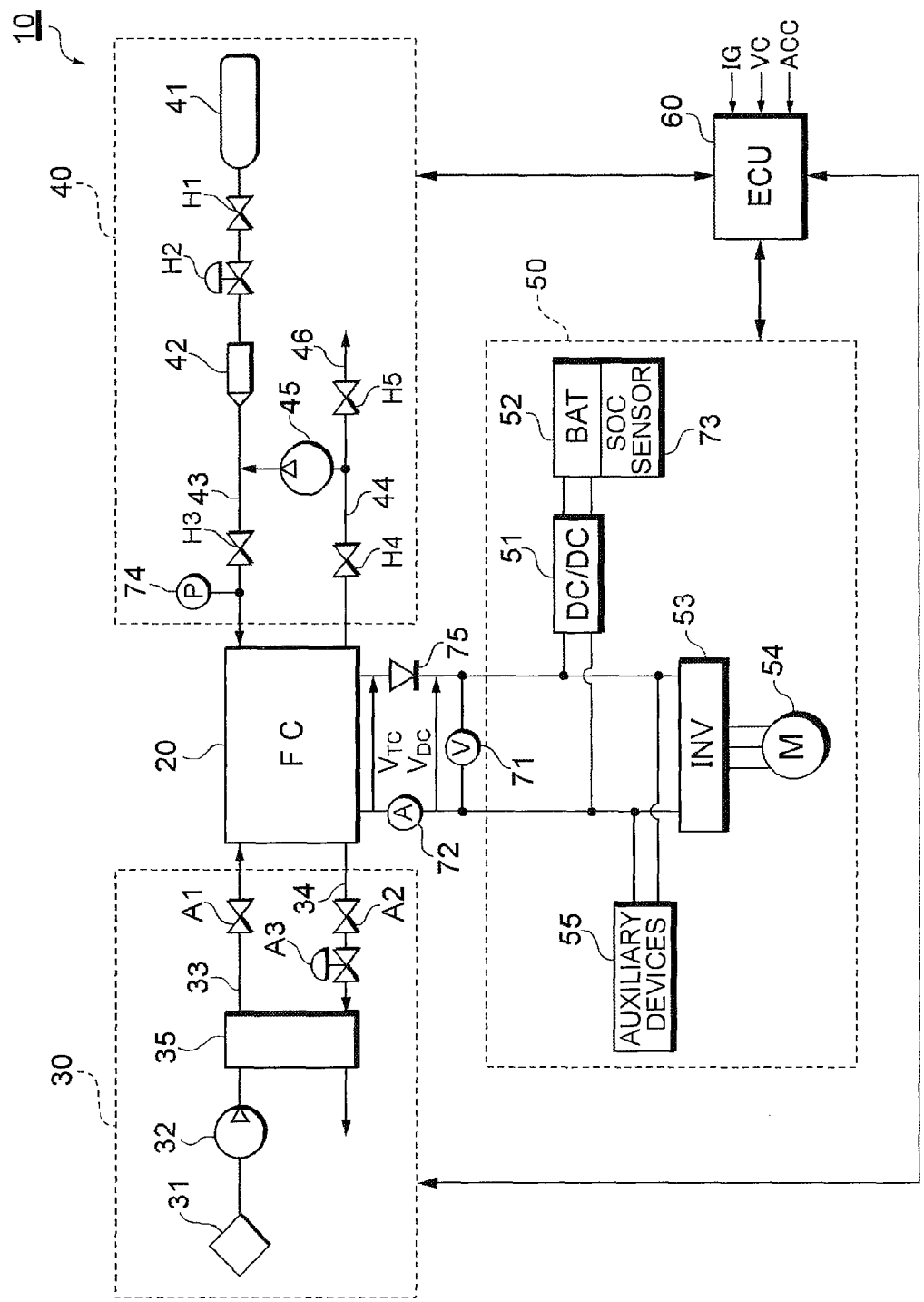
FIG. 1 is a diagram of a configuration of a fuel cell system according to the present invention.

FIG. 1 shows a configuration of a fuel cell system 10 functioning as a vehicle-mounted power supply system mounted in a fuel cell vehicle.

The fuel cell system 10 functions as a vehicle-mounted power supply system mounted in the fuel cell vehicle. The fuel cell system 10 includes a fuel cell stack 20 that receives a supplied reaction gas (fuel gas and oxidation gas) to generate power, an oxidation gas supply line 30 through which air as an oxidation gas is supplied to the fuel cell stack 20, a fuel gas supply line 40 through which a hydrogen gas as a fuel gas is supplied to the fuel cell stack 20, a power line 50 that controls charging and discharging of power, and a controller 60 that integrally controls the whole system.

The fuel cell stack 20 is a solid polyelectrolyte cell stack made up of a large number of cells stacked in series. In the fuel cell stack 20, an oxidation reaction expressed by Formula (1) occurs in an anode, and a reduction reaction expressed by Formula (2) occurs in a cathode. For the whole fuel cell stack 20, an electromotive reaction expressed by Formula (3) occurs.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

The fuel cell stack 20 includes a voltage sensor 71 attached thereto to detect an output voltage (FC voltage) from the fuel cell stack 20, and a current sensor 72 attached thereto to detect an output current (FC current).

The oxidation gas supply line 30 includes an oxidation gas passage 33 through which an oxidation gas to be supplied to the cathode of the fuel cell stack 20 flows, and an oxidation off gas passage 34 through which an oxidation off gas discharged from the fuel cell stack 20 flows. The oxidation gas passage 33 includes an air compressor 32 that takes in the oxidation gas from atmosphere via a filter 31, a humidifier 35 that humidifies the oxidation gas to be pressurized by the air compressor 32, and a shutoff valve A1 that shuts off the supply of the oxidation gas to the fuel cell stack 20. The oxidation off gas passage 34 includes a shutoff valve A2 that shuts off discharge of the oxidation off gas from the fuel cell stack 20, a backpressure regulating valve A3 that regulates an oxidation gas supply pressure, and a humidifier 35 that exchanges moisture between the oxidation gas (dry gas) and the oxidation off gas (wet gas).

The fuel gas supply line 40 includes a fuel gas supply source 41, a fuel gas passage 43 through which the fuel gas to be fed from the fuel gas supply source 41 to the anode of the fuel cell stack 20, a circulation passage 44 through which a fuel off gas discharged by the fuel cell stack 20 is returned to the fuel gas passage 43, a circulation pump 45 through which the fuel off gas in the circulation passage 44 is fed to the fuel gas passage 43 under pressure, and an exhaust and drain passage 46 divergently connected to circulation passage 44.

The fuel gas supply source 41 is composed of, for example, a high pressure hydrogen tank or hydrogen-occluded alloy and stores a hydrogen gas under a high pressure (for example, 35 MPa to 70 MPa). Opening a shutoff valve H1 allows the fuel gas to flow from the fuel gas supply source 41 to the fuel gas passage 43. The fuel gas has the pressure thereof reduced to, for example, about 200 kPa by a regulator H2 or an injector 42 before being supplied to the fuel cell stack 20.

The fuel gas supply source 41 may be composed of a reformer that generates a hydrogen-rich reformed gas from a hydrogen carbide-containing fuel, and a high-pressure gas tank in which the reformed gas generated by the reformer is pressurized and accumulated.

The fuel gas passage 43 includes a shutoff valve H1 that shuts off or allows the supply of the fuel gas from the fuel gas supply source 41, a regulator H2 that regulates the pressure of the fuel gas, an injector 42 that controls the amount of fuel gas supplied to the fuel cell stack 20, a shutoff valve H3 that shuts off the supply of the fuel gas to the fuel cell stack 20, and a pressure sensor 74.

The regulator H2 is a device that regulates an upstream pressure (primary pressure) to a preset secondary pressure, and is composed of, for example, a mechanical pressure reducing valve that reduces the primary pressure. The mechanical pressure reducing valve includes a housing in which a backpressure chamber and a pressure regulating chamber are formed opposite each other across a diaphragm. In the pressure reducing valve, a backpressure in the backpressure chamber reduces the primary pressure to a predetermined pressure in the pressure regulating chamber. The secondary pressure is thus obtained. The regulator H2 is located upstream of the injector 42 to enable an effective reduction in the upstream pressure of the injector 42. Thus, the mechanical structure (a valve disc, a housing, a channel, a driving device, and the like) of the injector 42 can be more freely designed. Furthermore, the reduced upstream pressure of the injector 42 enables inhibition of a situation in which movement of the valve disc of the injector 42 is hindered by an increase in the differential pressure between the upstream pressure and downstream pressure of the injector 42. This enables an increase in the variable pressure regulation range of the downstream pressure of the injector 42 and allows responsiveness of the injector 42 to be inhibited from being degraded.

The injector 42 is an electromagnetically driven on-off valve that enables a gas flow rate or gas pressure to be regulated by directly driving the valve disc at a predetermined driving period by means of an electromagnetic driving force to separate the valve disc from a valve seat. The injector 42 includes the valve seat with an injection hole through which a gas fuel such as a fuel gas is injected, a nozzle body through which the gas fuel is fed and guided to the injection hole, and the valve disc accommodated and held in the nozzle body so as to be movable in an axial direction (gas flow direction) of the nozzle body to open and close the injection hole.

In the present embodiment, the valve disc of the injector 42 is driven by a solenoid that is an electromagnetic driving device. Turning on and off a pulsed excitation current fed to the solenoid enables the opening area of the injection hole to be switched in two stages. A control signal output by the controller 60 controls a gas injection duration and a gas injection period of the injector 42 to precisely control the flow rate and pressure of the fuel gas. The injector 42 directly drivingly opens and closes the valve (valve disc and valve seat) by the electromagnetic driving force. The injector 42 is very responsive because the driving period of the valve can be controlled up to a very responsive region. To feed a required flow rate of gas downstream, the injector 42 changes at least one of the opening area (opening degree) and opening duration of the valve disc, provided in a gas channel in the injector 42, to regulate the flow rate of gas (or the molar concentration of hydrogen) fed downstream.

A shutoff valve H4 and an exhaust and drain passage 46 are connected to the circulation passage 44; the shutoff valve H4 shuts off the discharge of the fuel off gas from the fuel cell stack 20, and the exhaust and drain passage 46 diverges from the circulation passage 44. An exhaust and drain passage value H5 is disposed in the exhaust and drain passage 46. The exhaust and drain valve H5 is operated in response to an instruction from the controller 60 to discharge the fuel off gas, containing impurities in the circulation passage 44, and moisture to the exterior of the system. Opening the exhaust and drain valve H5 increases the concentration of impurities in the fuel off gas in the circulation passage 44 to enable an increase in the concentration of hydrogen in the fuel off gas circulating through the circulation line.

The fuel off gas discharged via the exhaust and drain valve H5 is mixed with the oxidation off gas flowing through the oxidation off gas passage 34 and diluted by a diluter (not shown in the drawings). The circulation pump 45 cyclically supplies the fuel off gas in the circulation line to the fuel cell stack 20 by means of driving of a motor.

The power line 50 includes a DC/DC converter 51, a battery 52, a traction inverter 53, a traction motor 54, and auxiliary devices 55. The fuel cell system 10 is configured as a parallel hybrid system in which the DC/DC converter 51 and the traction inverter 53 are connected in parallel with the fuel cell stack 20. The DC/DC converter 51 includes a function of increasing a DC voltage supplied by the battery 52 and outputting the increased DC voltage to the traction inverter 53, and a function of reducing DC power generated by the fuel cell stack 20 or regenerative power recovered by the traction motor 54 by means of regenerative braking to charge the battery 52. The functions of the DC/DC converter 51 control charging and discharging of the battery 52. Voltage conversion control performed by the DC/DC converter 51 controls operation points of (output voltage and output current from) the fuel cell stack 20.

The battery 52 functions as a storage source for surplus power, a storage source for regenerative energy during regenerative braking, and an energy buffer for a load variation associated with acceleration and deceleration of the fuel cell vehicle. For example, a secondary battery such as a nickel-cadmium battery, a nickel-hydrogen battery, or a lithium secondary battery is suitable as the battery 52. An SOC sensor 73 is attached to the battery 52 to detect SOC (State Of Charge).

The traction inverter 53 is, for example, a PWM inverter driven according to a pulse width modulation scheme. In accordance with a control instruction from the controller 60, the traction inverter 53 converts the DC voltage from the fuel cell stack 20 or the battery 52 into a three-phase AC voltage to control the rotating torque of the traction motor 54. The traction motor 54 is, for example, a three-phase AC motor making up a power source for the fuel cell vehicle.

The auxiliary devices 55 collectively refer to motors (power sources for, for example, pumps) arranged in the respective sections in the fuel cell system 10, inverters allowing the motors to be driven, and various vehicle-mounted auxiliary devices (for example, an air compressor, an injector, a cooling water circulation pump, and a radiator).

The controller 60 is a computer system including a CPU, a ROM, a RAM, and an I/O interface to control the relevant sections of the fuel cell system 10. For example, upon receiving a start signal IG output by an ignition switch, the controller 60 starts operating the fuel cell system 10. The controller 60 then determines the power requirement for the whole system based on an accelerator opening degree signal ACC output by an accelerator sensor and a vehicle speed signal VC output by a vehicle speed sensor. The power requirement for the whole system is the sum of vehicle traveling power and auxiliary device power.

Here, the auxiliary device power includes power consumed by vehicle-mounted auxiliary devices (the humidifier, the air compressor, a hydrogen pump, the cooling water circulation pump, and the like), power consumed by devices required to drive the vehicle (a speed change gear, a wheel control device, a steering device, a suspension system, and the like), and power consumed by devices disposed in a passenger space (an air conditioning device, a lighting system, an audio system, and the like).

The controller 60 determines the allocation of output power from the fuel cell stack 20 and output power from the battery 52 to control the oxidation gas supply line 30 and the fuel gas supply line 40 so that the amount of power generated by the fuel cell stack 20 equals to target power. The controller 60 also controls the DC/DC converter 51 to regulate the output voltage from the fuel cell stack 20 to control the operation points of (output voltage and output current from) the fuel cell stack 20. Moreover, the controller 60 outputs for example AC voltage instruction values for a U phase, a V phase, and a W phase to the traction inverter 53 as switching instructions to control the output torque and rotation speed of the traction motor 54 so as to obtain the target torque depending on the acceleration opening degree.

Figure 2:
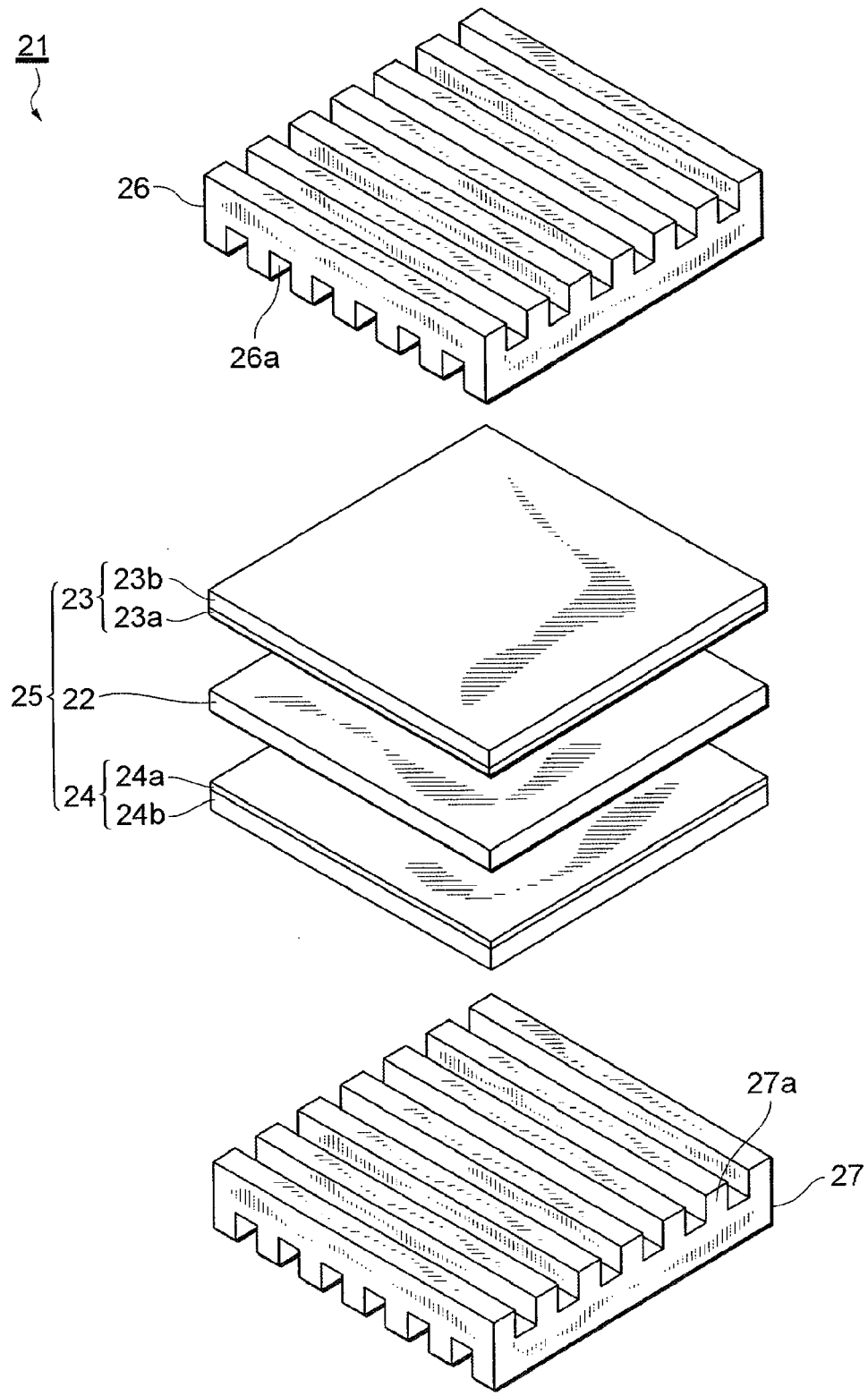
FIG. 2 is an exploded perspective view of cells making up the fuel cell stack.

FIG. 2 is an exploded perspective view of cells 21 making up the fuel cell stack 20.

Each of the cells 21 is composed of a electrolytic membrane 22, an anode 23, a cathode 24, and separators 26 and 27. The anode 23 and the cathode 24 are diffusion electrodes making up a sandwich structure in which the electrolytic membrane 22 is sandwiched between the anode 23 and the cathode 24, which are arranged opposite each other. The separators 26 and 27, composed of a non-air-permeable conductive material, further sandwich the sandwich structure therebetween so as to form channels for the fuel gas between the separator 26 and the anode 23 and channels for the oxidation gas between the separator 27 and the cathode 24. Ribs 26a with a recess cross section are formed in the separator 26. The anode 23 abuts against the ribs 26a to close the openings of the ribs 26a to form fuel gas channels. Ribs 27a with a recess cross section are formed in the separator 27. The cathode 24 abuts against the ribs 27a to close the openings of the ribs 27a to form oxidation gas channels.

The anode 23 is composed mainly of carbon powder carrying a platinum-containing metal catalyst (Pt, Pt—Fe, Pt—Cr, Pt—Ni, Pt—Ru, or the like). The anode 23 includes a catalyst layer 23a that is in contact with the electrolytic membrane 22 and a gas diffusion layer 23b formed on a surface of the catalyst layer 23a and which is both air permeable and electronically conductive. Similarly, the cathode 24 includes a catalyst layer 24a and a gas diffusion layer 24b. More specifically, the catalyst layers 23a and 24a are formed by dispersing, in an appropriate organic solvent, carbon powder carrying platinum or an alloy made up of platinum and another metal, adding an appropriate amount of electrolytic solution to the solvent to obtain a mixture like paste, and screen-printing the mixture on the electrolytic membrane 22. The gas diffusion layers 23b and 24b are formed of carbon cloth, carbon paper, or carbon felt which is obtained by weaving yarns made up of carbon fibers. The electrolytic membrane 22 is a proton conductive ion exchange membrane formed of a solid polymer material, for example, a fluorine-containing resin. The electrolytic membrane 22 exhibits high electric conductivity in a wet condition. The electrolytic membrane 22, the anode 23, and the cathode 24 form a membrane-electrode assembly 25.

Figure 3:
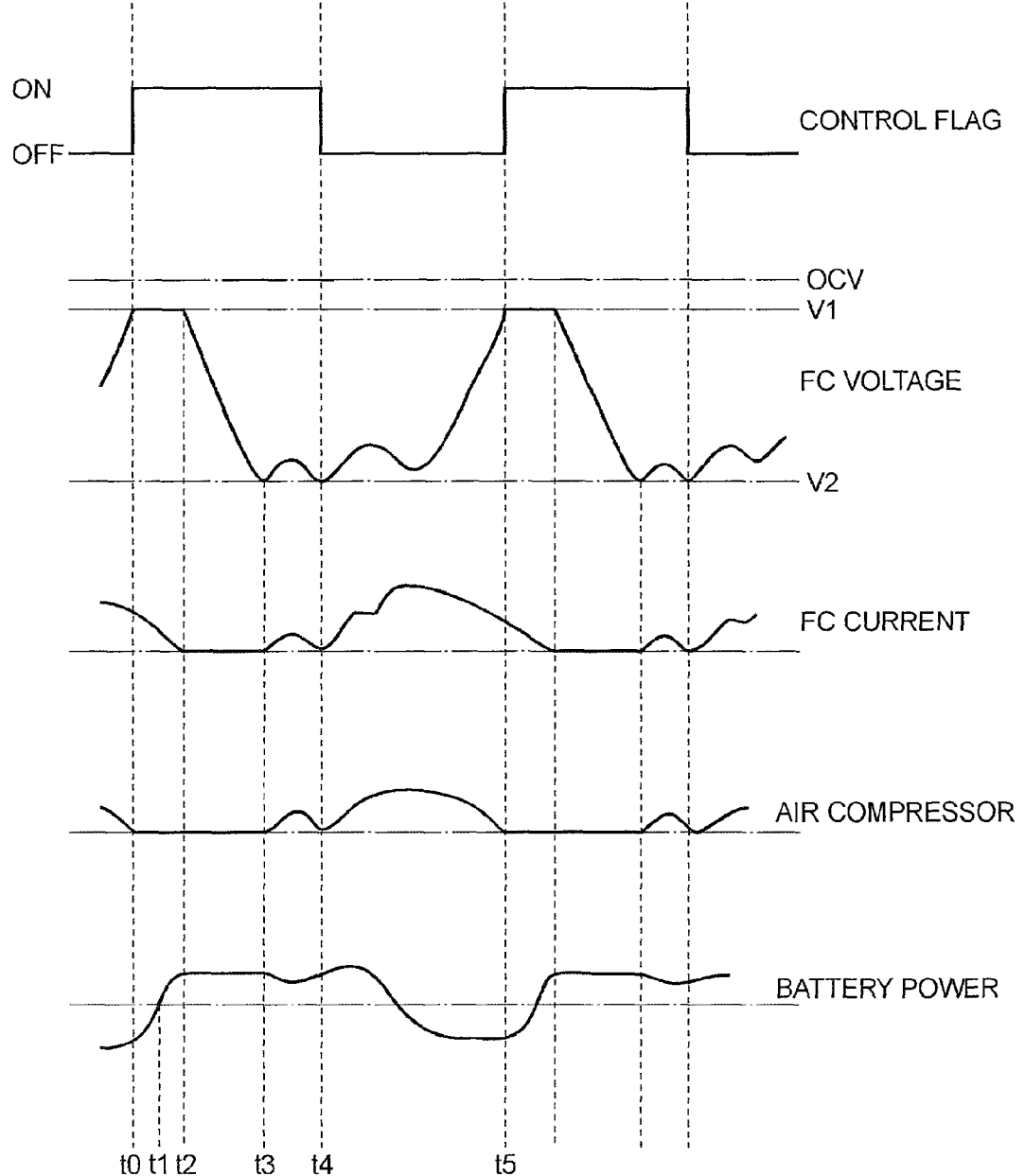
FIG. 3 is a timing chart showing control of operation of the fuel cell system according to the present embodiment.

FIG. 3 is a timing chart showing operation control of the fuel cell system 10.

The fuel cell system 10 switches the operation mode of the fuel cell stack 20 depending on an operation load to improve power generation efficiency. For example, in a low load region with low power generation efficiency (an operation region in which the power generation requirement is lower than a predetermined value), the fuel cell system 10 controls the operation of the fuel cell stack 20 by setting a power generation instruction value for the fuel cell stack 20 to zero. The fuel cell system 10 uses the power from the battery 52 as the power required to drive the vehicle or the power required to operate the system (this operation mode is hereinafter referred to as a first operation mode). On the other hand, in a high load region with high power generation efficiency (an operation region in which the power generation requirement is equal to or higher than a predetermined value), the fuel cell system 10 controls the operation of fuel cell stack 20 by calculating the power generation instruction value for the fuel cell stack 20 based on the accelerator opening degree and a vehicle speed. The fuel cell system 10 uses only the power generated by the fuel cell stack 20 or both the power generated by the fuel cell stack 20 and the power from the battery 52, as the power required to drive the vehicle or the power required to operate the system (this operation mode is hereinafter referred to as a second operation mode).

The fuel cell system 10 monitors a control flag indicating the operation mode, at a constant period. When the control flag is turned on, the fuel cell system 10 controls the operation of the fuel cell stack 20 in the first operation mode. When the control flag is turned off, the fuel cell system 10 controls the operation of the fuel cell stack 20 in the second operation mode. In either operation mode, the output voltage from the fuel cell stack 20 during normal operation is in principle limited to an operation range between an upper limit operating voltage V1 and a lower limit operating voltage V2.

The upper limit operating voltage V1 preferably meets the condition that the upper limit operating voltage V1 is within a voltage range appropriate to prevent possible elution of the platinum catalyst contained in the catalyst layers 23a and 24a of the fuel cell stack 20. Moreover, the upper operating voltage V1 preferably meets the condition that the upper operating voltage V1 is within a voltage range that is appropriate to, with the supply of the reaction gas to the fuel cell stack 20 stopped, allow the auxiliary devices 55 to consume the power generated by the fuel cell stack 20 when the output voltage from the fuel cell stack 20 is kept equal to the upper limit operating voltage V1. In the fuel cell stack 20, if the potential of the cathode 24 is maintained high, particularly during a low-density current operation or an idle operation, the platinum catalyst in the catalyst layer 24a may be eluted. In the description, control in which the output voltage from the fuel cell stack 20 is controllably set equal to or lower than the upper limit operating voltage V1 to maintain durability of the fuel cell stack 20 is referred to as high-potential avoidance control. The upper limit operating voltage V1 is also referred to as high-potential avoidance voltage. According to the present embodiment, in either operation mode, in principle, the high-potential avoidance control is performed. The upper limit operating voltage V1 is suitably set so that a voltage of about 0.9 V is provided per cell.

The lower limit operating voltage V2 preferably meets the condition that the lower limit operating voltage V2 is within a voltage range that is appropriate to prevent the cell voltage from decreasing to a reduction region. When the fuel cell stack 20 is continuously operated in an oxidation region, an oxidized film is formed on a surface of a platinum catalyst contained in the catalyst layer 24a to reduce the effective area of the platinum catalyst. Then, an active voltage increases to reduce an I-V characteristic of the fuel cell stack 20. A catalyst activation process enables the oxidized film to be reduced and removed from the platinum catalyst to recover the I-V characteristic. However, frequently changing the cell voltage between the oxidation region and the reduction region reduces the durability of the fuel cell stack 20. Furthermore, when the cell voltage is reduced down to the reduction region and then increased up to the oxidation region as the load requirement increases, the carbon carrying the platinum catalyst may be oxidized. In view of these circumstances, a possible reduction in the durability of the fuel cell stack 20 can be inhibited by controllably setting the output voltage from the fuel cell stack 20 to be equal to or higher than the lower limit operating voltage V2 during normal operation. The lower limit operating voltage V2 is suitably set so that a voltage of about 0.8 V is provided per cell.

The output voltage from the fuel cell stack 20 during normal operation is in principle controlled to between the upper limit operating voltage V1 and the lower limit operating voltage V2. However, the output voltage from the fuel cell stack 20 may be controllably set to be equal to or higher than the upper limit operating voltage V1 or equal to or lower than the lower limit operating voltage V2. For example, the output voltage from the fuel cell stack 20 is increased up to the open end voltage when the SOC of the battery 52 exhibits a predetermined value or more or when possible gas leakage is to be detected or when regenerative power is to be recovered by regenerative braking. Furthermore, for the catalyst activation process, the output voltage from the fuel cell stack 20 is reduced to the lower limit operating voltage V2 or lower.

In the first operation mode, the controller 60 sets the power generation instruction value to zero to stop the supply of the reaction gas to the fuel cell stack 20. The controller 60 further sets the voltage instruction value for the DC/DC converter 51 to be equal to the upper limit operating voltage V1 (time t0 to t4). Even after the supply of the reaction gas is stopped, an unchanged fraction of the reaction gas remains inside the fuel cell stack 20. Thus, the fuel cell stack 20 generates a small amount of power for some time.

A period from time t0 to time t2 is a power generation period during which a small amount of power continues to be generated by converting the chemical energy of the remaining reaction gas into electric energy. During the power generation period, the remaining reaction gas offers energy that allows the output voltage from the fuel cell stack 20 to remain equal to the upper limit operating voltage V1. Thus, the output voltage from the fuel cell stack 20 remains equal to the upper limit operating voltage V1. The power generated during the power generation period is consumed by the auxiliary devices 55. However, if the power fails to be completely consumed by the auxiliary devices 55, a surplus fraction of the power is charged into the battery 52.

During a period from t0 to time t1, the power generation energy of the fuel cell stack 20 exceeds the consumption capacity of the auxiliary devices 55. Thus, a fraction of the power generation energy is charged into the battery 52. However, the power generation energy emitted by the fuel cell stack 20 decreases gradually as the remaining reaction gas is consumed. Consequently, at time t1, the power generation energy emitted by the fuel cell stack 20 balances with the consumption capacity of the auxiliary devices 55. The power charged into the battery 52 is thus reduced to zero. During a period from time t1 to time t2, the power generation energy emitted by the fuel cell stack 20 is insufficient for the power consumed by the auxiliary devices 55. To make up for the insufficient power, power is fed from the battery 52 to the auxiliary devices 55.

A period from time t2 to time t4 is a power generation stop period during which the consumption of the remaining reaction gas prevents the output voltage from the fuel cell stack 20 from remaining equal to the upper limit operating voltage V1, to stop power generation. When the remaining reaction gas fails to offer an amount of energy required to keep the output voltage from the fuel cell stack 20 equal to the upper limit operating voltage V1, the power generation is stopped. The output voltage from the fuel cell stack 20 decreases gradually. During the power generation stop period, the power generation energy of the fuel cell stack 20 is reduced to zero. Thus, almost constant power is fed from the battery 52 to the auxiliary devices 55.

At time t3 when the output voltage from the fuel cell stack 20 decreases down to the lower limit operating voltage V2, the oxidation gas supply line 30 is driven to supply the oxidation gas to the fuel cell stack 20. The fuel cell stack 20 receives the supplied oxidation gas to generate power, with the output voltage from the fuel cell stack 20 increasing. Once the output voltage from the fuel cell stack 20 increases up to a predetermined voltage (for example, 360 V), the supply of the oxidation gas is stopped. In this manner, during the power generation stop period, every time the output voltage from the fuel cell stack 20 decreases down to the lower limit operating voltage V2, the oxidation gas is properly supplied to controllably prevent the output voltage from decreasing below the lower limit operating voltage V2.

In the second operation mode, the controller 60 calculates the power generation instruction value based on the load requirement and controls the supply of the reaction gas to the fuel cell stack 20. The controller 60 further controls the operation points (output voltage and output current) of the fuel cell stack 20 via the DC/DC converter 51 (time t4 to time t5). At this time, the voltage instruction value for the DC/DC converter 51 is limited to the operation range between the upper limit operating voltage V1 and the lower limit operating voltage V2.

Figure 4:
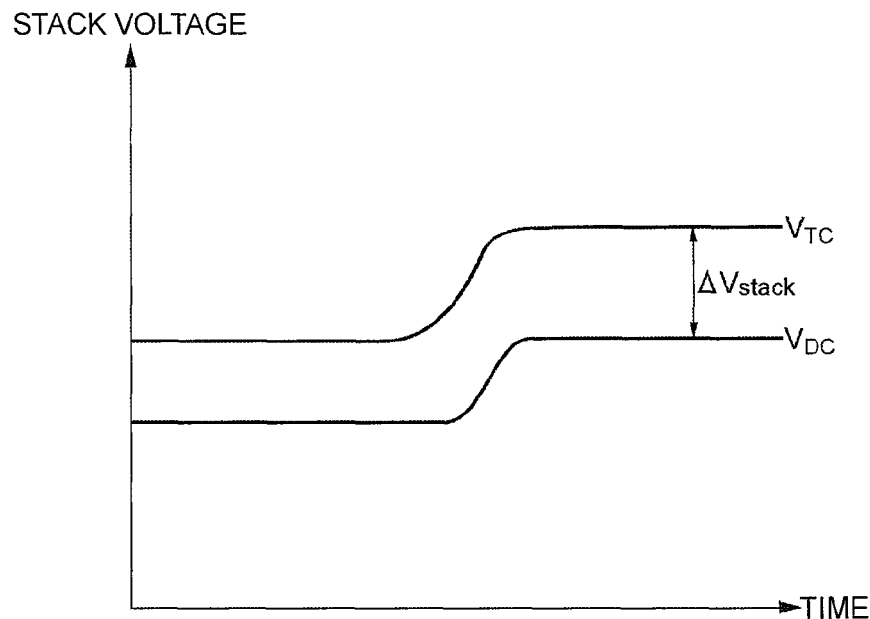
FIG. 4 is a graph showing an error in detection of a stack voltage.

As shown in FIG. 4, a measured voltage $V_{DC}$ measured by the voltage sensor 71 may be lower than an actual voltage $V_{TC}$ of the fuel cell stack 20 by $\Delta V_{stack}$. A possible major cause of the error $\Delta V_{stack}$ is a drop in the voltage of a diode 75 provided to prevent possible backflow of a stack current or an error in measurement by the voltage sensor 71. Such an error causes the controller 60 to control the DC/DC converter 51 such that the measured voltage $V_{DC}$ that is lower than the actual voltage $V_{TC}$ by $\Delta V_{stack}$ equals to a target voltage. Thus, the actual voltage $V_{TC}$ is controlled to a value larger than that of the target voltage by $\Delta V_{stack}$.

When the actual voltage $V_{TC}$ is controlled to the value larger than that of the target voltage by $\Delta V_{stack}$, degradation of the fuel cell stack 20 is promoted. Thus, preferably, the measured voltage $V_{DC}$ is corrected with the error $\Delta V_{stack}$ taken into account, and the DC/DC converter 51 is controlled such that the actual voltage $V_{TC}$ equals to the target voltage. Specifically, if the drop in the voltage of the diode 75 or the error in measurement by the voltage sensor 71 can be handled as a steady-state error, $\Delta V_{stack}$ may be added to the measured voltage $V_{DC}$ as a correction value to obtain the actual voltage $V_{TC}$. Then, the DC/DC converter 51 may be controlled so as to make the actual voltage $V_{TC}$ equal to the target voltage.

The actual voltage $V_{TC}$ is equal to the sum $V_{cell\_all}$ of the cell voltages of the cells 21 measured by a cell monitor. Thus, the error $\Delta V_{stack}$ between the $V_{cell\_all}$ and the $V_{DC}$ may be calculated using a predetermined arithmetic period. Then, the measured voltage $V_{DC}$ may be corrected in real time with the error $\Delta V_{stack}$ taken into account, and the DC/DC converter 51 may be controlled such that the actual voltage $V_{TC}$ equals to the target voltage.

Figure 5:
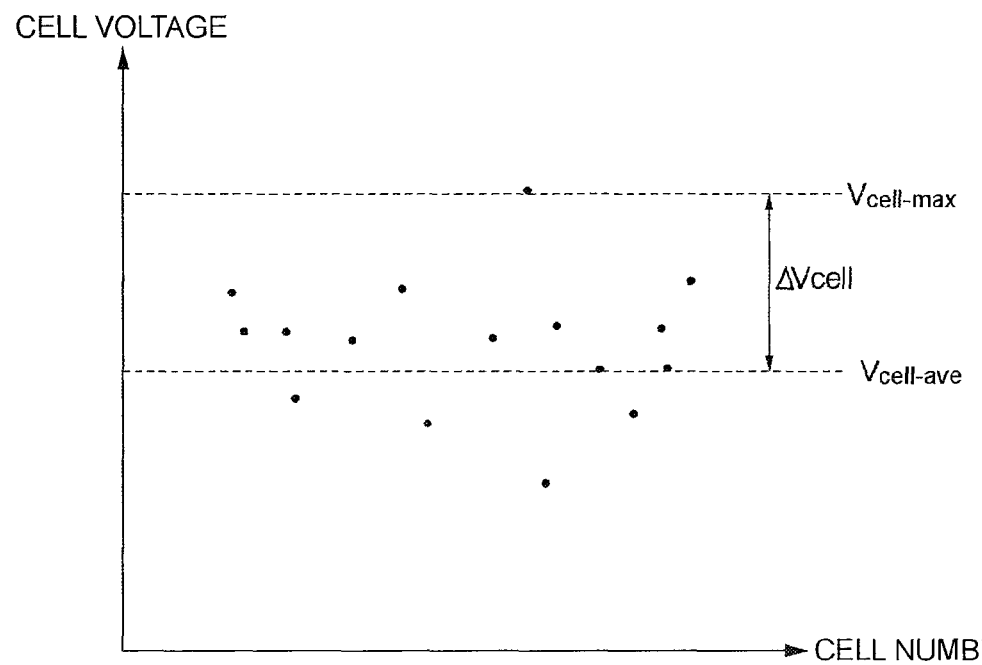
FIG. 5 is a graph showing a variation in cell voltage.

However, even when the DC/DC converter 51 is controlled such that the actual voltage $V_{TC}$ equals to the target voltage, since the output voltage (cell voltage) from the cell 21 varies among the cells 21 as shown in FIG. 5, the cell voltage of some of the cells 21 may exceed the target voltage per cell (the target voltage per cell refers to a voltage value obtained by dividing the target voltage of the fuel cell stack 20 by the total number of cells). In this case, since deterioration of some of the cells 21 is promoted, the controller 60 preferably corrects the target voltage so that the cell voltage of each of the cells 21 are prevented from exceeding the target voltage per cell. Specifically, the controller 60 preferably uses a cell voltage detecting device (not shown in the drawings) to monitor the cell voltage of each of the cells 21 configuring the fuel cell stack 20. The controller 60 thus controllably corrects the target voltage of the fuel cell stack 20 based on a difference $\Delta V_{cell}$ between a maximum cell voltage $V_{cell\_max}$ and an average cell voltage $V_{cell\_ave}$ so as to prevent the cell voltage of each of the cells 21 from exceeding the target voltage per cell.

Figure 6:
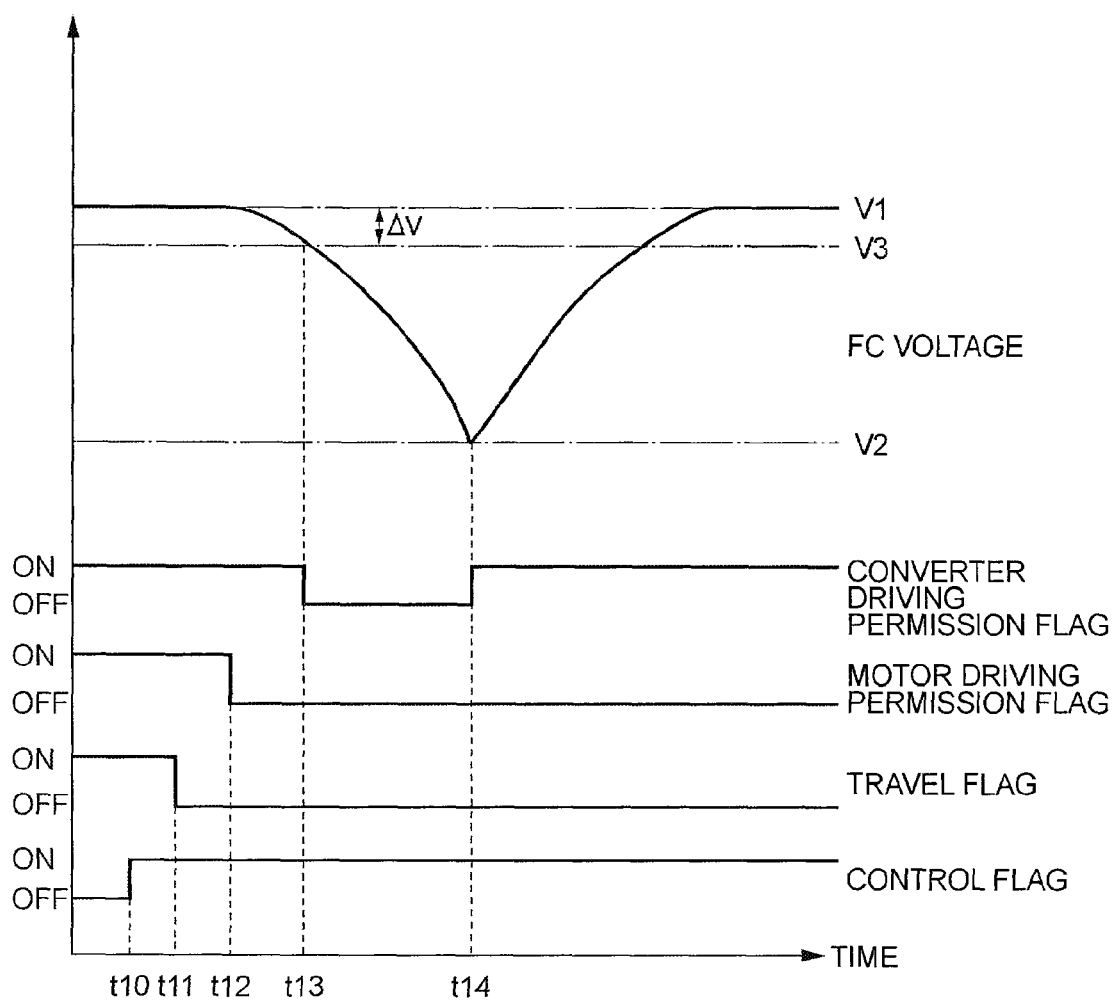
FIG. 6 is a timing chart showing intermittent stop of a DC/DC converter.

FIG. 6 is a timing chart showing intermittent stop of the DC/DC converter 51.

The timing chart shows a series of control processes in which the fuel cell vehicle starts with low-speed traveling, then decelerates gradually, and is finally stopped.

A load on the fuel cell vehicle traveling at a low speed decreases. At time t10 when the load requirement for the fuel cell stack 20 is lower than a predetermined threshold, the control flag that has been off is turned on. Thus, the operation mode of the fuel cell system 10 switches from the second operation mode to the first operation mode. At time t11 when the vehicle speed is equal to or lower than a predetermined value (for example, about several km/h), a travel flag that has been on is turned off. That travel flag is flag information indicating whether or not the vehicle is traveling. While the fuel cell vehicle is traveling (the vehicle speed is equal to or higher than a predetermined value), the travel flag is on. While the fuel cell vehicle is stopped (the vehicle speed is lower than the predetermined value), the travel flag is off.

At time t12 when the fuel cell vehicle is completely stopped, a motor driving permission flag that has been on is switched off. The motor driving permission flag is flag information indicating whether or not driving of the traction motor 54 is permitted. If driving of the traction motor 54 can be permitted, the motor driving permission flag is on. If driving of the traction motor 54 cannot be permitted (the traction motor 54 is shut down), the motor driving permission flag is off.

In the first operation mode, the controller 60 sets the power generation instruction value to zero to stop the supply of the reaction gas to the fuel cell stack 20. The controller 60 further sets the voltage instruction value for the DC/DC converter 51 to be equal to the upper limit operating voltage V1. Immediately after the supply of the reaction gas is stopped, a sufficient amount of reaction gas to keep the output voltage from the fuel cell stack 20 equal to the upper limit operating voltage V1 remains inside the fuel cell stack 20. However, since the remaining reaction gas is used to generate a small amount of power, the amount of the remaining reaction gas decreases gradually. When the remaining reaction gas no longer offers energy required to keep the output voltage from the fuel cell stack 20 equal to the upper limit operating voltage V1, the power generation is stopped. The output voltage from the fuel cell stack 20 decreases gradually.

At time t13 when the output voltage from the fuel cell stack 20 decreases from the upper limit operating voltage V1 by $\Delta V$, that is, down to a voltage V3, a converter driving permission flag that has been on is switched off. The converter driving permission flag is flag information indicating whether or not driving of the DC/DC converter 51 is permitted. If driving of the DC/DC converter 51 can be permitted, the converter driving permission flag is on. If driving of the DC/DC converter 51 cannot be permitted, the converter driving permission flag is off.

At time t14 when the output voltage from the fuel cell stack 20 is lower than the lower limit operating voltage V2, the controller 60 drives the oxidation gas supply system 40 to supply the oxidation gas to the fuel cell stack 20. Since the fuel cell stack 20 receives the supplied oxidation gas to generate power, the output voltage from the fuel cell stack 20 increases. Furthermore, at time t14 when the supply of the oxidation gas to the fuel cell stack 20 is started, the converter driving permission flag that has been off is switched on to restart the DC/DC converter 51. At time t14 when the DC/DC converter 51 is restarted, the control flag remains on, and the voltage instruction value for the DC/DC converter 51 is set to be equal to the upper limit operating voltage V1. Thus, the output voltage from the fuel cell stack 20 is controlled to a value between the upper limit operating voltage V1 and the lower limit operating voltage V2.

In this manner, the driving of the DC/DC converter 51 (a switching operation of the transistor) is stopped (this is hereinafter referred to as intermittent stop) under the conditions that "the traction motor 54 is shut down" and that "the output voltage from the fuel cell stack 20 decreases from the upper limit operating voltage V1 by $\Delta V$". This enables a reduction in a switching loss in the DC/DC converter 51 and an increase in energy efficiency.

The reason why the above-described two conditions are used for the intermittent stop of the DC/DC converter 51 will be explained. If the driving of the DC/DC converter 51 is stopped before the traction motor 54 is shut down, the voltage control of the fuel cell stack 20 by the DC/DC converter 51 fails to work. The output voltage from the fuel cell stack 20 is thus decreased by the traction inverter 53. As a result, the control may be disabled or the output voltage from the fuel cell stack 20 may be lower than the lower limit operating voltage V2.

While the output voltage from the fuel cell stack 20 is kept equal to the upper limit operating voltage V1, a sufficient amount of reaction gas may remain in the fuel cell stack 20, which may thus continues to generate power. In this condition, if the driving of the DC/DC converter 51 is stopped, the output voltage from the fuel cell stack 20 is increased by an amount equal to a fraction of the power generated by the fuel cell stack 20 which fails to be consumed by the traction inverter 53. The output voltage from the fuel cell stack 20 may thus exceed the upper limit operating voltage V1.

On the other hand, when the output voltage from the fuel cell stack 20 decreases from the upper limit operating voltage V1 by $\Delta V$, only a small amount of reaction gas remains, and the power generation is stopped. Thus, in spite of the stop of the driving of the DC/DC converter 51, the output voltage from the fuel cell stack 20 is prevented from increasing. For the above-described reasons, the above-described two conditions are used for the intermittent stop of the DC/DC converter 51.

FIG. 7 is a diagram illustrating execution conditions for the high-potential avoidance control.

As shown in the figure, to permit the high-potential avoidance control to be performed, all of the following conditions need to be met: (A1) the SOC of the battery 52 has a value equal to or lower than SOC1, (B1) the vehicle is not performing regenerative braking, and (C1) the determination for the gas leakage detection is not being performed. On the other hand, to inhibit the high-potential avoidance control from being performed, all of the following conditions need to be met: (A2) the SOC of the battery 52 has a value equal to or lower than SOC2, (B1) the vehicle is performing regenerative braking, and (C1) the determination for the gas leakage detection is being performed.

(Battery)

The controller 60 reads signals output by an SOC sensor 73 to periodically monitor a charging condition of the battery 52. When the SOC of the battery 52 is equal to or higher than SOC2 (for example, 75%), the controller 60 switches off the high-potential avoidance control that has been on; fulfillment of the high-potential avoidance control function which has been permitted is inhibited. While the high-potential avoidance control function is off, the output voltage from the fuel cell stack 20 is kept equal to the open end voltage. On the other hand, when the SOC of the battery 52 is equal to or lower than SOC1 (for example, 70%), the controller 60 switches on the high-potential avoidance control that has been off. While the high-potential avoidance control function is on, the output voltage from the fuel cell stack 20 is controllably set to be equal to or lower than the upper limit operating voltage V1.

In the first operation mode, the high-potential avoidance control keeps the output voltage from the fuel cell stack 20 equal to the upper limit operating voltage V1 even though the power generation instruction value for the fuel cell stack 20 is zero. The fuel cell stack 20 generates a small amount of power as a result of an electrochemical reaction caused by the remaining reaction gas. The small amount of power generated by the fuel cell stack 20 is expected to be able to be consumed by the auxiliary devices 55 as an auxiliary loss. However, the power may fail to be completely consumed exclusively by the auxiliary devices 55 owing to a variation in power generated by the fuel cell stack 20, a variation in power consumed by the auxiliary devices 55, or the like. In this case, a fraction of the power which fails to be consumed by the auxiliary devices 55 is charged into the battery 52. However, if the battery 52 offers a high SOC, the battery 52 may be overcharged and broken. Thus, as described above, the high-potential avoidance control function that has been on is switched off under the condition that the SOC of the battery 52 is equal to or higher than SOC2. As a result, the battery 52 can be prevented from being broken by overcharging.

In the above description, the example is shown in which the determination condition under which the high-potential avoidance control function is switched on and off is set based on the SOC of the battery 52. However, the determination condition may be set such that the high-potential avoidance control function is switched on and off based on the charging capability of the battery 52. For example, when the charging capability of the battery 52 becomes equal to or lower than Win1 (for example, −4 kW), the high-potential avoidance control function that has been off is switched on. When the charging capability of the battery 52 becomes equal to or higher than Win2 (for example, −2 kW), the high-potential avoidance control function that has been on is switched off. However, the determination condition under which the high-potential avoidance control function is switched on and off need not necessarily offer hysteresis characteristics.

(Regenerative Braking)

Figure 8:
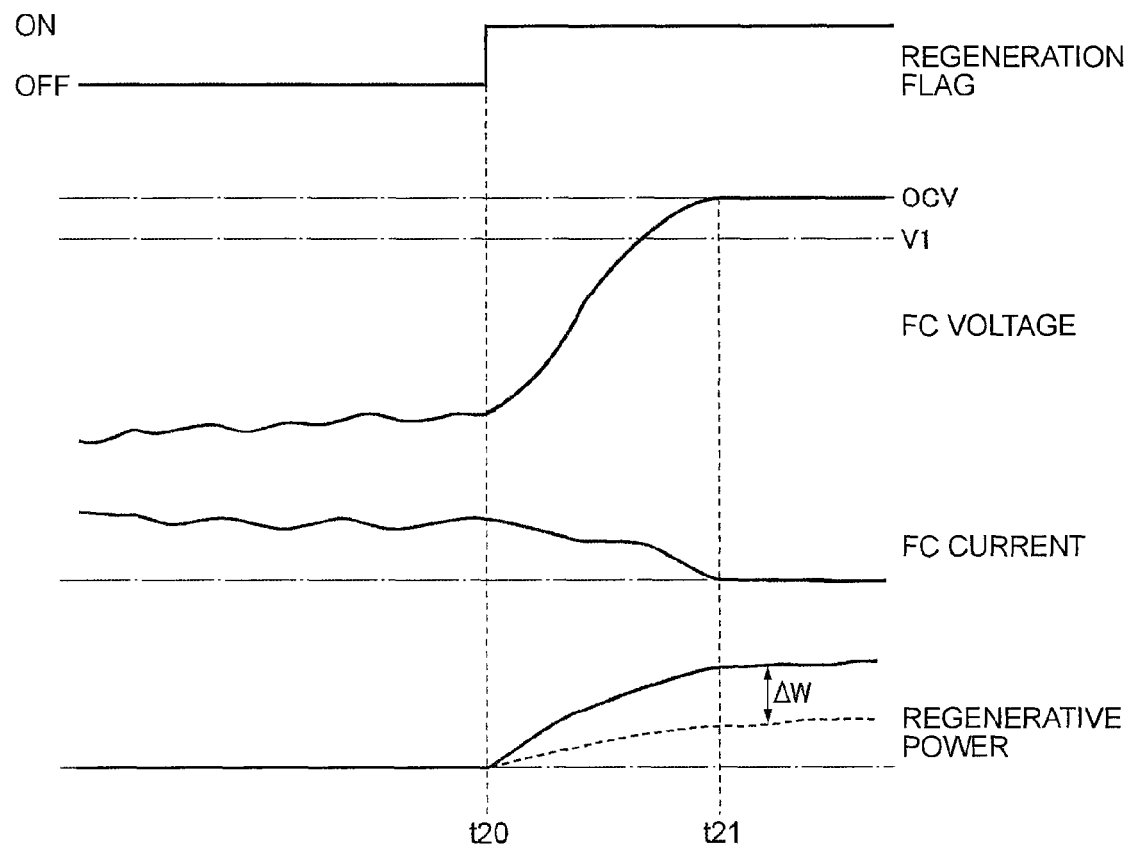
FIG. 8 is a timing chart showing operation control allowing the high-potential avoidance control to be switched on and off depending on whether or not regenerative braking is performed.

With reference to a timing chart shown in FIG. 8, description will be given of operation control allowing the high-potential avoidance control to be switched on and off depending on whether or not the regenerative braking is performed. The timing chart shows a series of processes in which the fuel cell vehicle shifts from the traveling condition to the regenerative braking. When a driver depresses a brake pedal at time t20, the traction motor 54 performs regenerative braking to convert the kinetic energy of the vehicle into electric energy. Furthermore, at time t20, a regeneration flag that has been off is switched on. The regeneration flag is flag information indicating whether or not the vehicle is performing regenerative braking. While the vehicle is not performing the regenerative braking, the regeneration flag is off. While the vehicle is performing the regenerative braking, the regeneration flag is on.

When the regeneration flag is turned on, the controller 60 changes the upper limit voltage of the fuel cell stack 20 from the upper limit operating voltage V1 to the open end voltage to permit the output voltage from the fuel cell stack 20 to exceed the upper limit operating voltage V1 and reach the open end voltage. During the regenerative braking, the load requirement for the fuel cell stack 20 is low. Thus, the output voltage from the fuel cell stack 20 increases gradually, equals to the open end voltage at time t21, and thereafter remains equal to the open end voltage. At and after time t21 when the output voltage from the fuel cell stack 20 equals to the open end voltage, the power generation current is zero.

The power generation current from the fuel cell stack 20 reduced to zero means that the fuel cell stack 20 stops generating power and eliminates the need to charge the generated power into the battery 52. Thus, a sufficient amount of regenerative power can be charged into the battery 52. Here, the regenerative energy shown by a solid line indicates power that can be charged into the battery 52 during the regenerative braking by inhibiting the high-potential avoidance control. The regenerative energy shown by a dotted line indicates power that can be charged into the battery 52 during the regenerative braking by performing the high-potential avoidance control. A difference ΔW between the two types of power indicates more regenerative power that can be recovered in the battery 52 as a result of the eliminated need to charge the power generated by the fuel cell stack 20 into the battery 52 during the regenerative braking.

Thus, when the vehicle performs regenerative braking, the high-potential avoidance control function is turned off to reduce the power generated by the fuel cell stack 20 to zero. Consequently, more regenerative power can be charged into the battery 52 to allow energy efficiency to be increased.

During the regenerative braking, a control operation may be performed which increases the upper limit operating voltage V1 up to a voltage lower than the open end voltage rather than turning off the high-potential avoidance control function. Furthermore, if the battery 52 exhibits a low SOC, not only the regenerative power recovered by the traction motor 54 but also the power generated by the fuel cell stack 20 can be charged into the battery 52. Thus, the high-potential avoidance control may be turned off under the condition that the regenerative braking is performed when the SOC of the battery 52 is equal to or higher than a predetermined value.

Furthermore, the target value of the high-potential avoidance voltage during the regenerative braking may be changed depending on the traveling mode (D/B range) of the vehicle. Here, the D range is a traveling mode used for normal traveling. The B range is a traveling mode used when a braking force that is stronger than that used during the normal traveling is required as is the case in which the vehicle travels downhill or along a slap. During the regenerative braking by the traction motor 54, a motor regeneration torque is converted into power, which is then charged into the battery 52. Thus, if the high-potential avoidance control is performed even during the regenerative braking, the following power balance is established.

Battery charged power+auxiliary device consumption power=motor regeneration power+fuel cell generation power (4)

Formula (4) indicates that an increased amount of power generated by the fuel cell during the vehicle braking correspondingly reduces the motor regeneration power. In this case, a sufficient braking torque fails to be ensured. Thus, during the vehicle braking, the high-potential avoidance voltage is preferably increased to reduce the fuel cell generation power to ensure a sufficient braking torque. Thus, the controller 60 variably sets the high-potential avoidance voltage so that Formula (5) holds true during the vehicle braking.

Battery charged power+auxiliary device consumption power≈motor regeneration power+fuel cell generation power (5)

Figure 9:
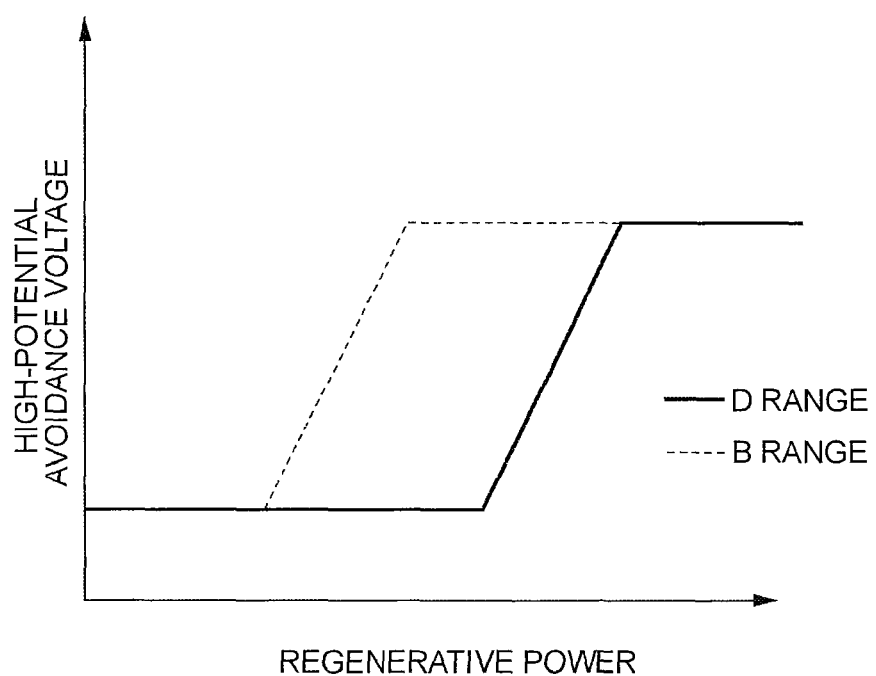
FIG. 9 is a graph showing a relationship between a traveling mode and the high-potential avoidance voltage.

Here, the high-potential avoidance voltage derived from the relation in Formula (5) may be held in the ROM in the controller 60 as such map data as shown in FIG. 9. In FIG. 9, the axis of abscissa indicates the regenerative power. The axis of ordinate indicates the high-potential avoidance voltage. The B and D/R ranges involve different braking torques and are thus shown as different map data. A solid line indicates the map data for the D range, and a dashed line indicates the map data for the B range. The controller 60 determines whether the traveling mode of the vehicle is the D range or the B range, based on a shift position. If the traveling mode is the B range, the controller 60 increases the target value of the high-potential avoidance voltage compared to that set if the traveling mode is the D range, to ensure a strong braking force. Thus, drivability of the vehicle can be enhanced.

(Gas Leakage Detection)

With reference to a timing chart shown in FIG. 10, description will be given of operation control allowing the high-potential avoidance control to be switched on and off depending on whether or not the gas leakage detection is performed. The timing chart shows a series of control processes for determining whether or not gas (hydrogen) is leaking from the fuel gas pipe line in the fuel cell system 10 while the stopped fuel cell battery is being operated in the first operation mode.

At time t30 when the power requirement for the fuel cell stack 20 becomes lower than a predetermined value owing to the stop of the fuel cell vehicle, the control flag that has been off is switched on. Then, the controller 60 controllably operates the fuel cell stack 20 in the first operation mode.

When the stopped fuel cell vehicle starts to be controllably operated in the first operation mode, the controller 60 activates a gas leakage detection routine for determining whether or not hydrogen is leaking from the fuel gas pipe line. When the gas leakage detection routine is activated, the shutoff valve H3, disposed upstream of a fuel gas inlet of the fuel cell stack 20, and the shutoff valve H4, disposed downstream of a fuel gas outlet are each closed. Thus, a closed space is formed inside the fuel gas pipe line. A gas pressure inside the closed space is detected by the pressure sensor 74. Gas leakage is determined to be occurring if the amount of decrease in the gas pressure inside the closed space per unit time is equal to or larger than a predetermined threshold.

At time t30 when the gas leakage detection routine is activated, a gas leakage detection flag that has been off is switched on. The gas leakage detection flag is flag information indicating whether or not the gas leakage detection process is being carried out. While the gas leakage detection process is being carried out, the gas leakage detection flag is on. While the gas leakage detection process is not being carried out, the gas leakage detection flag is off.

At time t30 when the gas leakage detection flag is turned on, a high-potential avoidance flag that has been on is switched off. The high-potential avoidance flag is flag information indicating whether or not the high-potential avoidance control is permitted. When the high-potential avoidance control is permitted, the high-potential avoidance flag is on. When the high-potential avoidance control is inhibited, the high-potential avoidance flag is off. When the high-potential avoidance control is inhibited during the gas leakage detection, the output voltage from the fuel cell stack 20 starts to increase gradually from the upper limit operating voltage V1 at time t30 and eventually reaches the open end voltage. Once the output voltage from the fuel cell stack 20 equals to the open end voltage, the power generation by the fuel cell stack 20 is stopped.

At time t31 when time required for the gas leakage determination elapses to complete the gas leakage detection process, a gas leakage detection completion flag that has been off is switched on. The gas leakage detection completion flag is flag information indicating whether or not the gas leakage detection has been completed. When the gas leakage detection is completed, the gas leakage detection completion flag is turned on. Before the gas leakage detection is completed, the gas leakage detection completion flag is off.

Furthermore, at time t31 when the gas leakage detection process is completed, the gas leakage detection flag that has been on is switched off, and the high-potential avoidance flag that has been off is switched on. When the high-potential avoidance flag that has been off is switched on, the output voltage from the fuel cell stack 20 starts to decrease gradually from the open end voltage at time t31 and eventually reaches the upper limit operating voltage V1. When the gas leakage detection process is completed, shutoff valves 81 and 82 are opened.

Thus, the closed space is formed inside the fuel gas pipe line, and the amount of decrease in the gas pressure inside the closed space is measured after the predetermined time. Consequently, when the high-potential avoidance control is permitted during the gas leakage detection, the fuel cell stack 20 generates power to consume the hydrogen gas inside the closed space, resulting in a possible erroneous determination. In contrast, according to the present embodiment, the high-potential avoidance control during the gas leakage detection is inhibited. This allows inhibition of the consumption of the hydrogen gas inside the closed space caused by power generation by the fuel cell stack 20, enabling an accurate gas leakage determination.

In the above-described embodiment, the configuration in which the fuel cell system 10 is used as a vehicle-mounted power supply system is illustrated. However, the configuration of the fuel cell system 10 is not limited to this example. For example, the fuel cell system 10 may be mounted in any mobile object (a robot, a ship, an airplane, or the like) other than the fuel cell vehicle as a power source. Alternatively, the fuel cell system 10 according to the present embodiment may be used as a power generation facility (stationary power generation system) such as a house or a building.

Industrial Applicability

According to the present invention, the upper limit of the output voltage from the fuel cell is set to be equal to the high-potential avoidance voltage lower than the open end voltage. Thus, the catalyst can be inhibited from being degraded by an increase in the output voltage from the fuel cell up to the open end voltage.

The invention claimed is:
1. A fuel cell system comprising:
  a fuel cell which receives a supplied reaction gas to generate power;
  a calculation device programmed to calculate the a sum of the a power which can be charged by an electric storage device that is not fully charged and a power which can be consumed by an auxiliary device that is more than zero;

a control device programmed to,
  when a power requirement for the fuel cell is lower than a predetermined value, stop supply of the reaction gas to the fuel cell and keep an output voltage from the fuel cell equal to a high-potential avoidance voltage which is lower than an open end voltage and,
  when the power requirement for the fuel cell is equal to or higher than the predetermined value, control the output voltage in order for the output voltage to be less or equal to the high-potential avoidance voltage, and
the electric storage device, wherein if power generated by the fuel cell exceeds the sum of the power which can be charged by the electric storage device and the power which can be consumed by the auxiliary device, the control device is programmed to permit the output voltage from the fuel cell to increase up to the open end voltage.

2. The fuel cell system according to claim 1, further comprising a DC/DC converter that controls the output voltage from the fuel cell,
  wherein when the power requirement for the fuel cell is lower than the predetermined value, the control device is programmed to stop driving of the DC/DC converter when the output voltage from the fuel cell becomes lower than the high-potential avoidance voltage by a predetermined voltage.

3. The fuel cell system according to claim 1, further comprising a plurality of shut-off valves disposed in a pipe line through which the reaction gas is supplied to the fuel cell,
  wherein the control device is programmed to close the plurality of shut-off valves to form a closed space inside the pipe line, and while detecting a possible variation in a gas pressure inside the closed space to detect possible gas leakage, the control device permits the output voltage from the fuel cell to increase up to the open end voltage.

4. The fuel cell system according to claim 1, wherein the fuel cell is a cell stack comprising a plurality of stacked cells, and the control device is programmed to correct the high-potential avoidance voltage so that a highest output cell voltage from the plurality of cells is equal to or lower than a predetermined cell voltage value.

* * * * *